United States Patent

Wang

Patent Number: 5,222,430
Date of Patent: Jun. 29, 1993

[54] JUICER/MIXER DEVICE

[76] Inventor: Johnson Wang, No. 9, Alley 1, Lane 410, Ta Tung Rd., Kuei Shan Hsiang, Tao Yuan Hsien, Taiwan

[21] Appl. No.: 932,234

[22] Filed: Aug. 19, 1992

[51] Int. Cl.⁵ .......................... A23N 1/02; A47J 19/02
[52] U.S. Cl. ...................................... 99/512; 99/511; 99/513; 241/37.5; 241/92; 241/282.1
[58] Field of Search .................... 99/495, 510-513, 99/484, 536, 537; 210/360.1, 380.1, 369; 241/37.5, 92, 282.1, 282.2; 366/314

[56] References Cited

U.S. PATENT DOCUMENTS

| 2,297,880 | 10/1942 | Fredrickson | 99/512 |
|---|---|---|---|
| 2,311,379 | 2/1943 | Gillanders | 99/512 |
| 2,845,971 | 8/1958 | Cordero | 99/512 |
| 3,892,365 | 7/1975 | Verdun | 241/282.1 X |
| 4,183,293 | 1/1980 | Arao et al. | 99/513 X |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,840,119 | 6/1989 | Caldi | 99/512 |

FOREIGN PATENT DOCUMENTS

| 1164612 | 3/1964 | Fed. Rep. of Germany | 99/512 |
|---|---|---|---|
| 8906106 | 7/1989 | PCT Int'l Appl. | 99/513 |
| 746496 | 3/1956 | United Kingdom | 99/513 |

Primary Examiner—Timothy F. Simone
Attorney, Agent, or Firm—Poms, Smith, Lande & Rose

[57] ABSTRACT

A juicer/mixer includes an actuating device for providing electrical power to a rotating shaft thereon, to which a squeezing housing device is engaged, thus allowing food to be processed in the squeezing housing device. Food is milled in the squeezing housing device and, after double filtering, juice is obtained from a juice outlet, and the dregs are remained in an inside wall of the squeezing housing device. A dreg displacement switch is provided to trigger a stopper to expel the dregs via a dreg outlet device by utilizing centrifugal force.

2 Claims, 7 Drawing Sheets

JUICER/MIXER DEVICE

FIELD OF THE INVENTION

The present invention relates to a juicer/mixer, and more particularly to a juicer/mixer which provides dreg discharging and double filtering effect.

BACKGROUND OF THE INVENTION

Juicers/mixers are popular at the present time. However, the conventional juicer/mixer does not provide a double filtering effect, causing a large amount of foam on top of the juice. Also, the conventional juicer/mixer does not provide residue discharging effect, causing the user difficulties in removing the residue.

It is the purpose of the present invention, therefore, to mitigate and/or obviate the above-mentioned drawback in the manner set forth in the detailed description of the preferred embodiment.

An object of the present invention is to substantially eliminate defects or drawbacks encountered in the prior art described above.

Another object of the present invention is to provide an improved juicer/mixer having a double filtering effect to make the juice purer than a conventional juicer.

According to one aspect of the present invention, the juicer/mixer includes an actuating device for providing electrical power to a rotating shaft thereon, to which a squeezing housing device is engaged, thus allowing food to be processed in the squeezing housing device. The sqeezing housing device has a filter portion in a side wall thereof, a plurality of hole-like cutter blades on the bottom thereof, a transmission socket protruding outward from the bottom for engaging to the rotating shaft of the actuating device, a circular flange portion with a plurality of grids formed thereon. A barrel is mounted on the actuating device, having a second filter on the bottom thereof, while leaving a central hole allowing the protruding socket of the squeezing housing device to pass through and a side hole thereof providing an output path for the juice. A dreg outlet device is mounted on the barrel device having a circular side wall, inside which is formed a circular inner flange portion, and a dreg outlet. When the squeezing housing device is engaged to the actuating device, the circular flange portion thereof contacts with the inner flange portion of the dreg outlet device, such that a plurality of cells are formed by the grids on the circular flange portion of the squeezing housing device and the circular side wall of the dreg outlet device. A cap device having a dreg displacement switch engaged to a stopper therein is positioned above the squeezing housing device, with the stopper remaining in the squeezing housing means. When the dreg displacement switch is manually engaged, the stopper moves a predetermined distance, causing the stopper to almost come in contact with the side wall filter of the squeezing housing device. Consequently dregs are gathered on the side wall filter and forwarded to cells between the squeezing housing device and the dreg outlet device. The dregs on each cell are sent to the dreg outlet of the dreg outlet device by the centrifugal effect of the rotating squeezing housing device.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
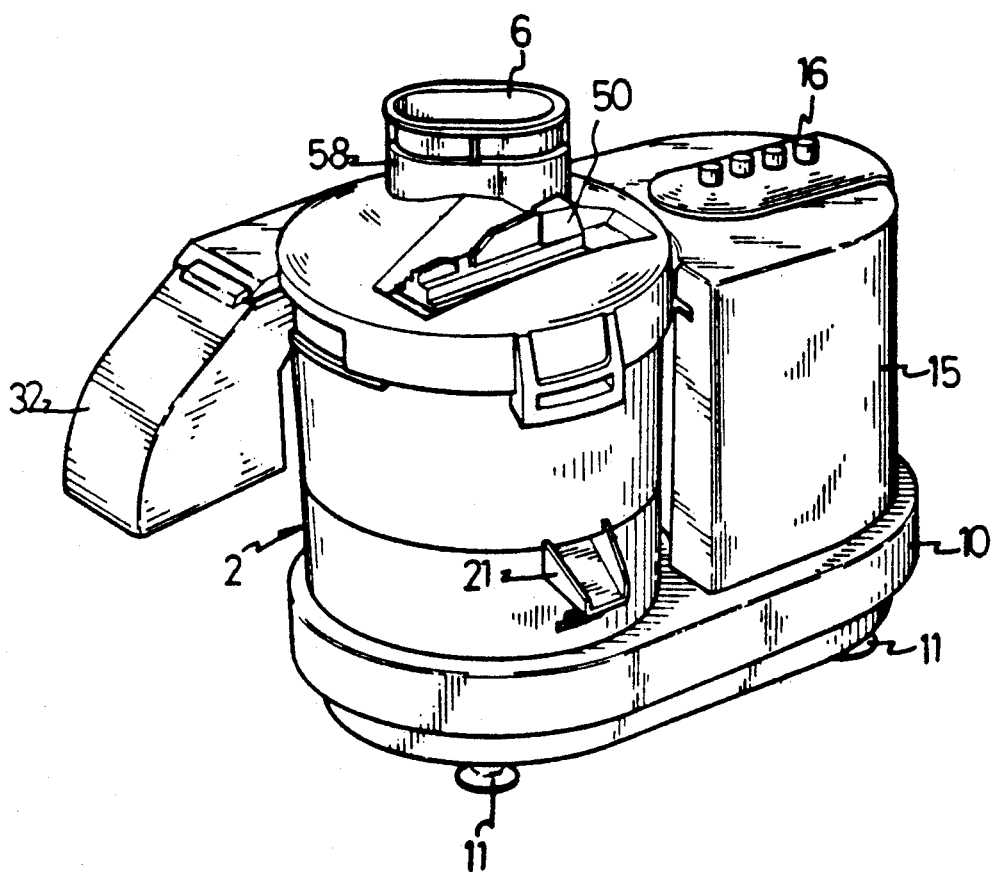
FIG. 1 is a perspective view of a juicer/mixer in accordance with the present invention.

Referring to FIG. 1, a juicer/mixer of the present invention is shown. The food (including fruit) is depressed into a tube 58 and a pressing handle 6 is manually controlled to press the food so as to obtain pure juice from a juice outlet 21. A plurality of buttons 16 are used to control the machine, which is well known and not described in detail herein. A dreg displacement switch 50 is used to discharge dregs by manual force exerted thereon. A dreg outlet 32 is used for dregs output. FIG. 1 merely illustrates an outlook of the juicer/mixer, and the detail thereof is shown in the following Figs.

Figure 2:
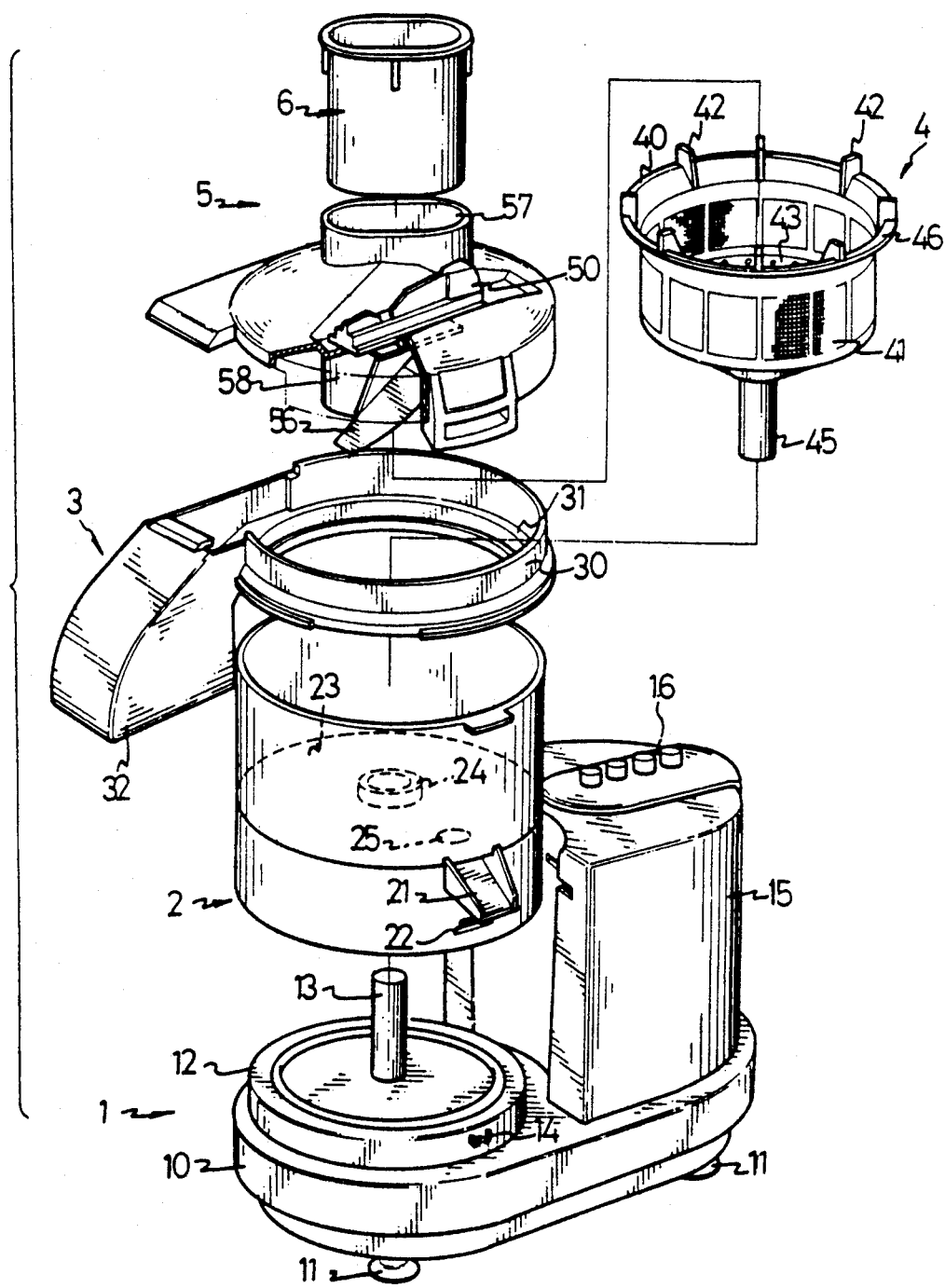
FIG. 2 is an exploded view of FIG. 1.

Referring to FIG. 2, a juicer/mixer apparatus comprises an actuating means 1 for providing required power for the whole machine, a barrel means 2 for second filtering, a dreg outlet means 3 for dreg discharging, a squeezing housing means 4 for milling the food and providing a first filtering, a cap means 5 for food inlet, processing, and dreg discharging control, and a pressing handle 6 for pressing the food in milling.

The actuating means 1 comprises a body portion 10, from part of which a disk-like seat 12 protrudes upward, and from another part of which a semi-cylinder 15 protrudes upward just beside the disk-like seat 12. A plurality of legs 11 are formed at the bottom of the body portion 10. A rotating shaft 13 protruding upward from the axis of the seat 12 is electrically controlled to rotate. A plurality of switch buttons 16 are formed on a top surface of the semi-cylinder 15 for controlling electricity supplied to the rotating shaft 13.

The barrel means 2 is detachably mounted on the disk-like seat 12 and comprises a middle wall 23 which has a central hole 24 through the axis thereof and a side hole 25 also through the middle wall 23. The middle wall 23 is slanted such that the side hole 25 is located in the lowest side thereof allowing juice to pass through. A second filter 20 is positioned on the middle wall 23. A juice outlet 21 is formed at a lower side of the barrel means 2 and is in communication with the side hole 25.

The barrel means 2 has two fixing holes 22 located at a periphery near the bottom thereof and the disk-like seat 12 has two latching pins 14 in the periphery thereof allowing the fixing holes 22 to be secured on the latching pins 14 thereby securing the barrel means 2 on the actuating means 1.

The dreg outlet means 3 is secured to a top edge of the barrel means 2 having a circular side wall 30 inside which a circular inner flange portion 31 is formed. and a dreg outlet 32 extending from the circular side wall 30 for discharging dregs.

The squeezing housing means 4 is received in the barrel means 2 having a circular flange portion 40 at the top thereof for contacting against the inner flange portion 31 of the dreg outlet means 3. A circular side wall of the squeezing housing means 4 is formed as a first filter 41. A plurality of hole-like cutter blades 43 are formed at an inner bottom of the squeezing housing means 4. A transmission socket 45 protrudes outward from the bottom of the squeezing housing means 4 and is mounted on the rotating shaft 13 of the actuating means 1. A plurality of grids 42 are formed on an upper surface of the circular flange portion 40. When the squeezing housing means 4 is mounted on the actuating means 1, the circular flange portion 40 contacts against the inner flange portion 31 of the dreg outlet means 3 causing a plurality of cells (see FIG. 6) 46 to be formed between the grids 42 of the circular flange portion 40 and the circular side wall 30 of the dreg outlet means 3. When a user operates the switch buttons 16, the rotating shaft 13 rotates, which in turn causing the squeezing housing means 4 to rotate.

The cap means 5 is secured to the top of the dreg outlet means 3. A food tube 58 extends both upward and downward from the cap means 5 for receiving and processing food therein. A food feed inlet 57 is formed at the top end of the food tube 58 for receiving food. A lower end of the food tube 58 almost contacts with the hole-like cutter blades 43 such that the food can be milled by the hole-like cutter blades below the food tube 58. Also referring to FIGS. 4 to 6, a stopper 56 extends from an inner side of the cap means 5 to the squeezing housing means 4 and thus has a first distance to the side wall filter 41 of the squeezing housing means 4. A dreg displacement switch 50 is secured to the stopper 56 such that when the dreg displacement switch 50 is manually engaged, the stopper 56 almost contacts the side wall filter 41 of the squeezing housing means 4.

The pressing handle 6 is allowed to fit into the food feed inlet 57 for pressing food therein.

Figure 3:
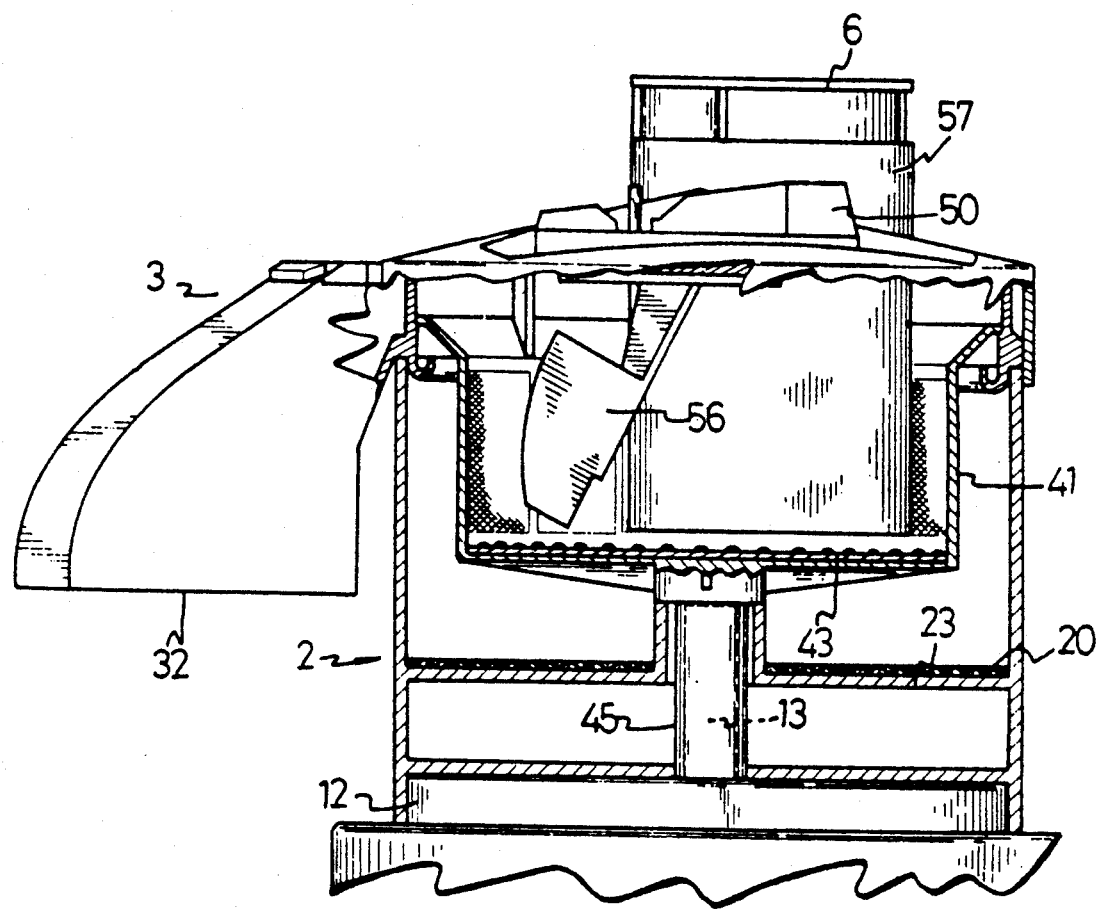
FIG. 3 is a partial cross-sectional view taken along the line 3—3 of FIG. 1.
Figure 4:
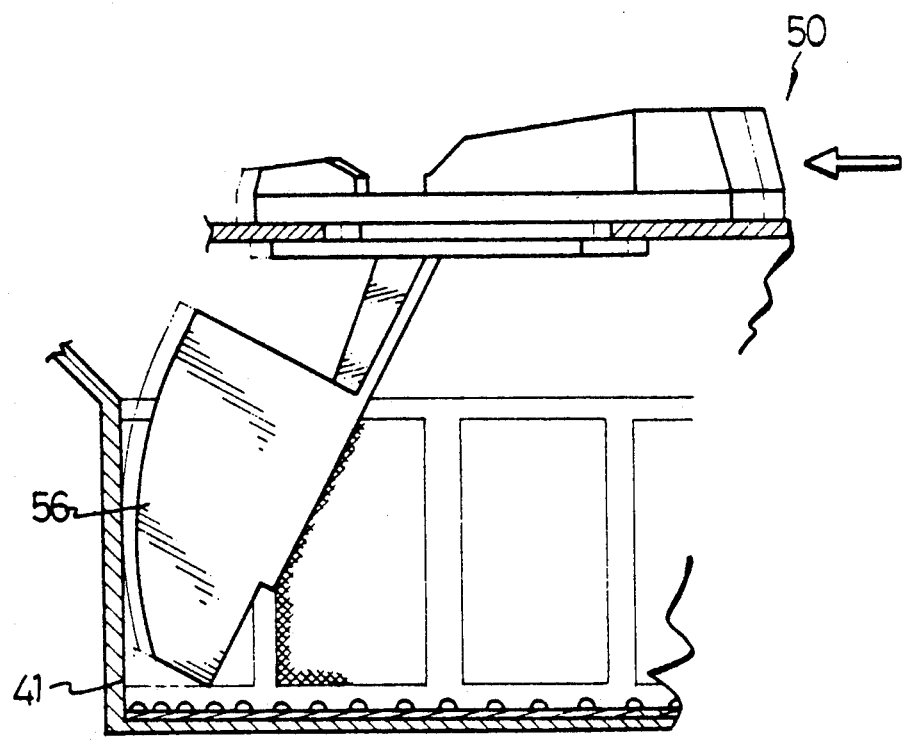
FIG. 4 is a partial cross-sectional view of a residue discharging switch and a stopper.
Figure 5:
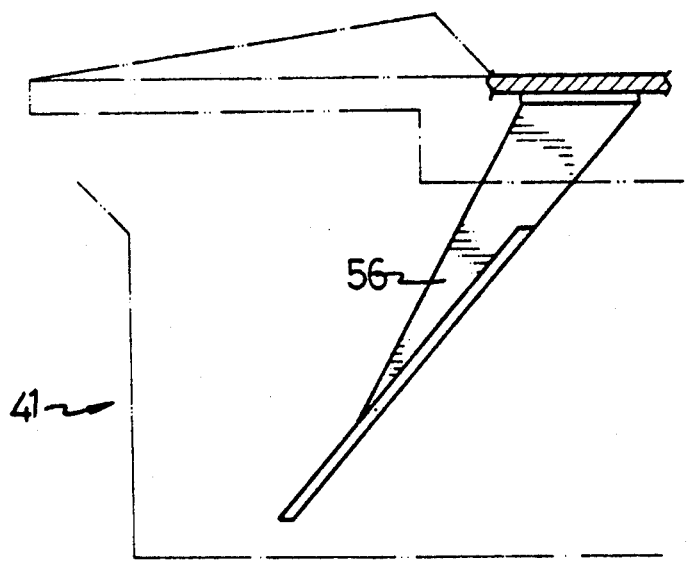
FIG. 5 is a partial cross-sectional view of the stopper of FIG. 4.
Figure 6:
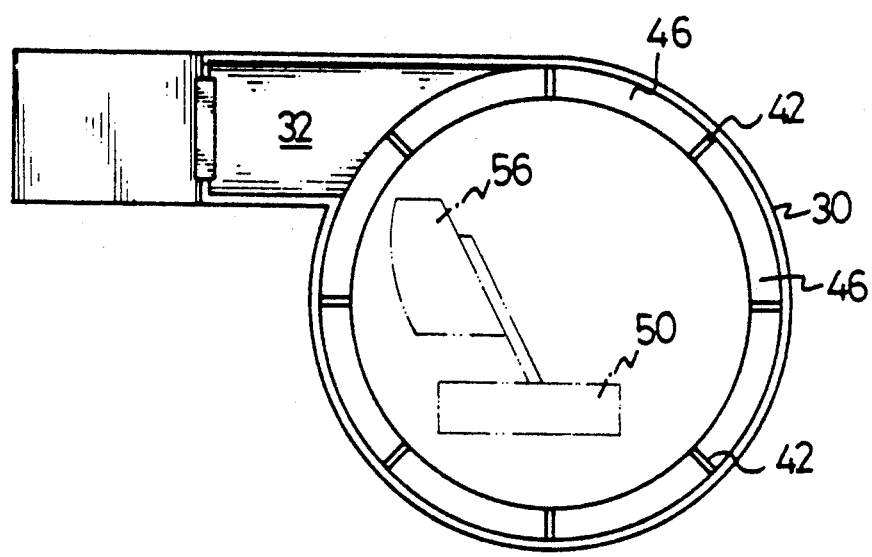
FIG. 6 illustrates a partially top view of the present invention, with the cap means being removed.

Basically, the operation of the juicer/mixer of the present invention includes two steps: a first step to mill the food to obtain juice; and a second step to discharge the dregs left inside the machine. Referring to FIGS. 2 and 3, in the first step, a user puts food into the tube 58 of the cap means 5, pressing the food with the pressing handle 6, and turning on power (by pressing a predetermined button) to force the squeezing housing means 4 to rotate. Thus the hole-like cutter blades 43 therein will mill the food, and juice will emerge from the juice outlet 21. However, some dregs will remains in the side wall filter 41 because of the effect of centrifugal force from the rotation of the squeezing housing means 4. Referring to FIGS. 4 to 6, in the second step, the user engages the dreg displacement switch 50 (whilst the squeezing housing means 4 is still rotating), causing the engaged stopper 56 to almost come into contact with the side wall filter 41, thereby gathering the dregs thereon, and further transmitting the dregs to each cell 46. The dregs in each cell 46 are forwarded to the dreg outlet 32 of the dreg outlet means 3 by centrifugal force of the rotating squeezing housing means 4, when each cell 46 is in alignment with the dreg outlet 32.

Figure 7:
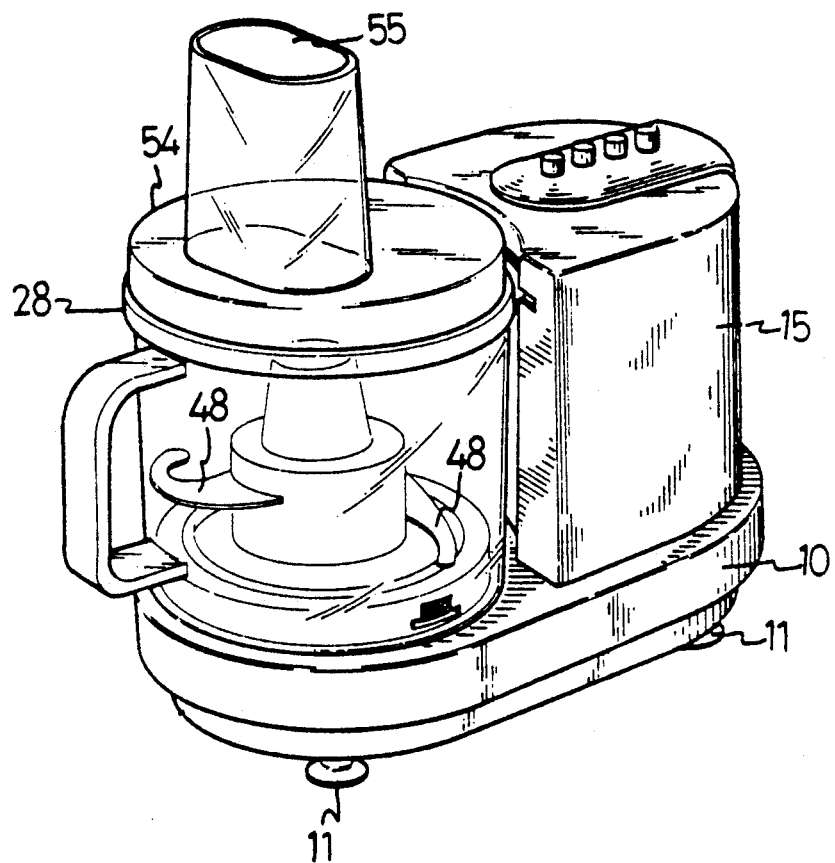
FIG. 7 illustrates that the present invention is used as a mixer.

FIG. 7 is another embodiment of the present invention showing a mixer for food such as pork and the like. The mixer comprises a container 28 mounted on the actuating means 1. A cover means 54 having a food inlet 55 covers the container 28. A blade socket 47 having two blade leaves 48 is mounted on the rotating shaft 13 of the actuating means 1. The actuating means 1 of the mixer is the same as mentioned previously.

Figure 8:
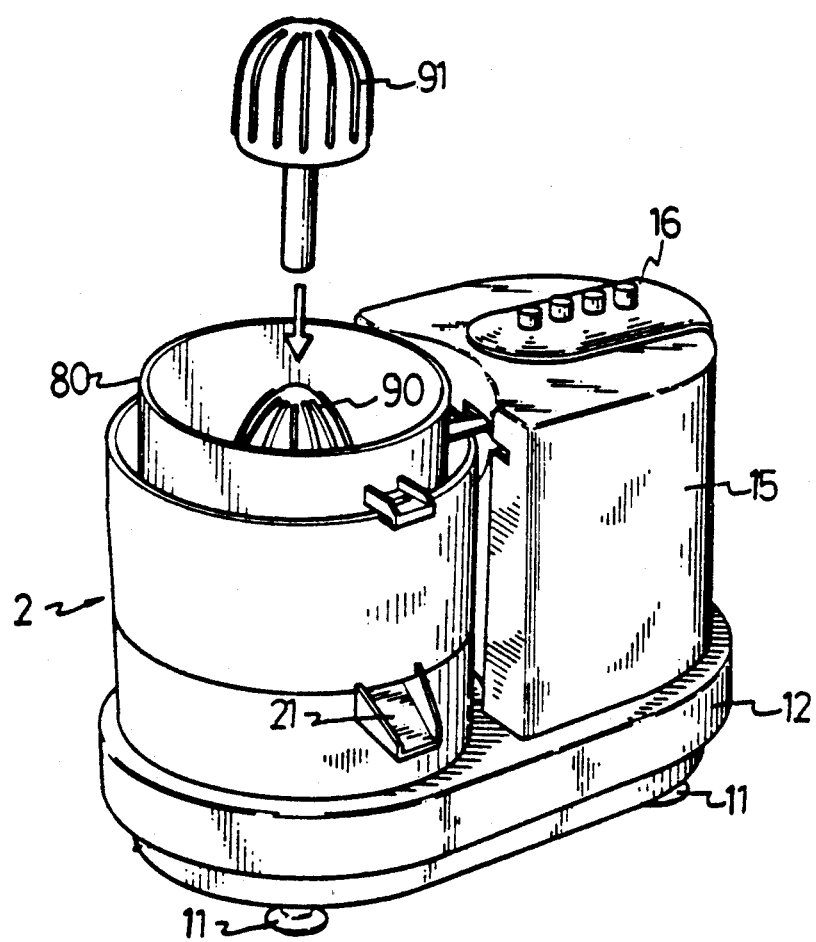
FIG. 8 illustrates that the present invention is used as a juicer.

FIG. 8 is a further embodiment of the present invention, showing a lemon (or orange or grapefruit) juice maker. A filter housing 80 is mounted on the barrel means 2 having a filter (not shown) at the bottom thereof for separating juice and dregs. A juicer head 90 is engaged to the rotating shaft 13 of the actuating means 1 for juice making, which is well known and not described in detain herein. After operation, the juice emerges from the juice outlet 21 and the dregs will be left in the filter housing 80.

Although the invention has been explained in relation to its preferred embodiment, it is to be understood that many other possible modifications and variations can be made without departing the spirit and scope of the invention as hereinafter claimed.

I claim:

1. A juicer/mixer apparatus comprising:
   an actuating means (1) which comprises a body portion (10), a disk-like seat (12) protruding upward from part of said body portion (10), a semi-cylinder (15) protruding from the left part of said body portion (10) and being beside said disk-like seat (12), a rotating shaft (13) protruding from the axis of said seat (12) being electrically controlled to rotate, a plurality of switch buttons (16) being formed on a top surface of said semi-cylinder (15) for controlling electricity supplied to said rotating shaft (13);
   a barrel means (2) flexibly mounted on said disk-like seat (12) comprising a middle wall (23) which has a central hole (24) and a side hole (25), said middle wall (23) being slanted and being formed such that said side hole (25) is located in the lowest side thereof, a second filter (20) being positioned on said middle wall (23), a juice outlet (21) formed at a lower side of said barrel means (2) and being in communication with said side hole (25);
   a dreg outlet means (3) being secured to a top edge of said barrel means (2) having a circular side wall (30) inside which a circular inner flange portion (31) is formed, and a dreg outlet (30) extending from said circular side wall (30) for discharging dregs;
   a squeezing housing means (4) being received in said barrel means (2) having a circular flange portion (40) at the top thereof for contacting against said inner flange portion (31) of said dreg outlet means (3), a circular side wall formed as a first filter (41) thereof, a plurality of hole-like cutter blades (43) at an inner bottom thereof, a transmission socket (45) protruding outward from the bottom thereof and mounted on said rotating shaft (13) of said actuating means (1), and a plurality of grids (42) formed on an upper surface of said circular flange portion (40), such that when said squeezing housing means (4) is mounted on said actuating means (1) said circular flange portion (40) contacts against said inner flange portion (31) of said dreg outlet means (3) causing a plurality of cells to be formed between said grids (42) of said circular flange portion

(40) and said circular side wall (30) of said dreg outlet means;

a cap means (5) secured to the top of said dreg outlet means (3) having a food tube (58) extending both upward and downward therefrom for temporarily receiving food for food processing, a food feed inlet (57) formed on an upward end of said food tube (56) for receiving food while a downward end thereof almost come into contact with said hole-like cutter blade (43) of said squeezing housing means (4), a stopper (56) extending from an inner side of said cap means (5) to said squeezing housing means (43) thus has a first distance to said side wall filter (41) of said squeezing housing means (4), a dreg displacement switch (50) engaged to said stopper (56) such that when said dreg displacement switch (50) is manually engaged said stopper (56) substantially contacts said side wall filter (41) of said squeezing housing means (4); and a pressing handle (6) being allowed to fit into said food tube (58) from said food feed inlet (57) for pressing food therein.

2. A juicer/mixer as claimed in claim 1, wherein said barrel means (2) has two fixing holes (22) located at periphery near the bottom thereof and said disk-like seat (12) has two latching pins in the periphery thereof allowing said fixing holes (22) to be secured on said latching pins (14).

* * * * *